US009333576B2

(12) United States Patent
Bayer et al.

(10) Patent No.: US 9,333,576 B2
(45) Date of Patent: May 10, 2016

(54) METHOD FOR PRODUCING AND REPAIRING A PART, AND PART OF A GAS TURBINE

(75) Inventors: Erwin Bayer, Dachau (DE); Matija Burger, München (DE); Martin Bussmann, Schwabhausen (DE); Alexander Gindorf, Schwabhausen (DE); Albin Platz, Ried-Baindlkirch (DE)

(73) Assignee: MTU AERO ENGINES AG, Munich (DE)

( * ) Notice: Subject to any disclaimer, the term of this patent is extended or adjusted under 35 U.S.C. 154(b) by 1315 days.

(21) Appl. No.: 12/808,738

(22) PCT Filed: Dec. 18, 2008

(86) PCT No.: PCT/DE2008/002133
§ 371 (c)(1),
(2), (4) Date: Sep. 10, 2010

(87) PCT Pub. No.: WO2009/080013
PCT Pub. Date: Jul. 2, 2009

(65) Prior Publication Data
US 2011/0002789 A1 Jan. 6, 2011

(30) Foreign Application Priority Data
Dec. 22, 2007 (DE) .................. 10 2007 062 559

(51) Int. Cl.
| F01D 5/30 | (2006.01) |
| B23H 3/00 | (2006.01) |
| F01D 5/00 | (2006.01) |
| B23H 9/10 | (2006.01) |
| B23K 20/02 | (2006.01) |
| B23P 6/00 | (2006.01) |
| B23P 15/00 | (2006.01) |
| F01D 5/12 | (2006.01) |

(52) U.S. Cl.
CPC .. *B23H 3/00* (2013.01); *B23H 9/10* (2013.01); *B23K 20/02* (2013.01); *B23K 20/023* (2013.01); *B23K 20/028* (2013.01); *B23P 6/005* (2013.01); *B23P 15/006* (2013.01); *F01D 5/005* (2013.01); *F01D 5/12* (2013.01); *F01D 5/3061* (2013.01); *F05B 2230/239* (2013.01); *F05D 2230/11* (2013.01); *F05D 2230/232* (2013.01); *Y10T 29/49238* (2015.01)

(58) Field of Classification Search
CPC ... F01D 5/005; F01D 5/3061; F05D 2230/11; F05D 2230/239
USPC ............... 29/889, 889.21, 889.23; 416/213 R
See application file for complete search history.

(56) References Cited

U.S. PATENT DOCUMENTS

| 3,352,770 | A | * | 11/1967 | Crawford ................ B23H 3/00 204/224 R |
| 3,588,426 | A | * | 6/1971 | Harriau et al. .................. 219/67 |
| 3,697,718 | A | * | 10/1972 | Von Hollen et al. ............ 219/62 |
| 3,873,512 | A | * | 3/1975 | Latanision .................... 205/643 |
| 4,772,372 | A | * | 9/1988 | Bruns et al. .............. 204/224 M |
| 4,883,216 | A | | 11/1989 | Patsfall |
| 4,997,534 | A | * | 3/1991 | Thornton ................. B23H 3/00 204/290.12 |
| 5,066,370 | A | * | 11/1991 | Andreshak et al. ........... 205/651 |
| 5,114,548 | A | * | 5/1992 | Rhoades ....................... 205/662 |
| 5,511,949 | A | * | 4/1996 | Thore ........................ 416/213 R |
| 5,755,031 | A | * | 5/1998 | Baumgarten et al. ........ 29/889.1 |
| 5,820,744 | A | * | 10/1998 | Edwards et al. .............. 205/640 |
| 6,221,235 | B1 | * | 4/2001 | Gebhart ........................ 205/654 |
| 6,231,748 | B1 | * | 5/2001 | Agafonov ..................... 205/645 |
| 6,387,242 | B1 | * | 5/2002 | Wei et al. ...................... 205/665 |
| 6,478,545 | B2 | * | 11/2002 | Crall et al. ................ 416/213 R |
| 6,542,843 | B1 | * | 4/2003 | Metzinger et al. ............ 702/113 |
| 6,616,408 | B1 | * | 9/2003 | Meier ........................ 416/193 A |
| 6,676,825 | B1 | * | 1/2004 | Gebhart ........................ 205/660 |
| 6,968,290 | B2 | * | 11/2005 | Wei et al. ...................... 702/171 |
| 7,318,884 | B2 | * | 1/2008 | Mielke ..................... 204/224 M |
| 7,634,854 | B2 | * | 12/2009 | Meier ........................... 29/889.1 |
| 8,262,897 | B2 | * | 9/2012 | Bayer et al. ................... 205/654 |
| 2003/0006137 | A1 | * | 1/2003 | Wei et al. ..................... 204/280 |
| 2005/0098445 | A1 | * | 5/2005 | Batzinger et al. ............. 205/644 |
| 2006/0085979 | A1 | * | 4/2006 | Bayer et al. ................ 29/889.23 |
| 2006/0249398 | A1 | * | 11/2006 | Becker .......................... 205/663 |
| 2007/0039179 | A1 | * | 2/2007 | Koehler et al. ............. 29/889.23 |

FOREIGN PATENT DOCUMENTS

| DE | 19858702 A1 | | 6/2000 | |
| DE | 102004057527 B4 | * | 6/2007 | ............. B23H 3/00 |
| GB | 2169837 A | * | 7/1986 | ............. B23H 7/26 |
| JP | 2006110712 A | * | 4/2006 | |
| WO | WO 2006012852 A1 | * | 2/2006 | ............. B23H 9/10 |
| WO | 2007095902 A | | 8/2007 | |

* cited by examiner

*Primary Examiner* — Sean J Younger
(74) *Attorney, Agent, or Firm* — Barlow, Josephs & Holmes, Ltd.

(57) ABSTRACT

The invention relates to a method for producing and repairing a part comprising at least two joined metal components, especially components of a gas turbine. In said method, corresponding joining surfaces of the components are joined together and connected by means of a pressure welding process, a machining allowance in the area of a joining zone of the two joining surfaces is upset during the joining process, and once the two components have been joined together, the machining allowance is machined by means of a precise electrochemical machining (PECM) process until a predefined final contour of the part has been obtained. The invention further relates to a gas turbine part obtained by means of the disclosed method.

15 Claims, No Drawings

METHOD FOR PRODUCING AND REPAIRING A PART, AND PART OF A GAS TURBINE

BACKGROUND OF THE INVENTION

The present invention relates to a method for producing and repairing a part comprising at least two metal components joined together, in particular, components of a gas turbine, the joining and connection of the corresponding joining surfaces of the components being conducted by means of a pressure welding process, and in the joining process, a machining allowance is upset in the region of a joining zone of the two joining surfaces. In addition, the invention relates to a part produced by the named method.

Slender three-dimensional geometries of metal parts, such as for example, Blisk rotor blades, are usually processed from a solid material. Of course, combinations of materials cannot be used here. These geometries, which are sparing of materials and versatile in application can be produced by means of a joining process. Different methods of the prior art are known for joining metal components by means of inductive high-frequency pressure welding. Thus, for example, DE 198 58 702 A1 describes a method for joining blade parts of a gas turbine, wherein a thin blade section and at least one other blade part are provided. Here, corresponding joining surfaces of these elements are positioned essentially flush at a distance from one another and subsequently are welded together by exciting an inductor with high-frequency current and bringing them together with contact of their heated joining surfaces. The inductor is excited with a constant frequency, which in general lies above 0.75 MHz. The frequency is also selected as a function of the geometry of the joining surfaces. Additional inductive high-frequency pressure welding methods are known from EP 1112141 B1 and EP 1140417 B1. In addition, it is known to join components by means of linear friction welding methods. In the case of thin-walled parts, such as, for example, thin-walled turbine blades, this method, however, is no longer applicable, since the existing geometry of distancing [the two parts]* impedes the introduction of the friction force. The joined part usually has a machining allowance, which must then be machined in order to obtain a desired final contour. Thus, whether it is the case of Blisk rotor blades, corresponding to the use of a blade that already has a final contour in the thin blade region, or it is the case of using of a blade that has machining allowances, in each case, the joining zone or the overall blade must be machined. In the case of rigid blades, for example, this can be achieved by an adaptive cutting process. In the case of thin part structures, however, due to the cutting forces that occur, this may lead to damage, especially to a bending of the structure, such as, for example, a blade geometry.

*Note: Words or phrases enclosed in brackets are added by the translator.

SUMMARY OF THE INVENTION

It is thus an object of the present invention to provide a method of this generic type for producing and repairing a part comprising at least two metal components joined together, in particular, components of a gas turbine, in which a material-sparing and a secure joining of the components as well as a material-sparing final processing of the joined part are assured.

In addition, an object of the present invention is to provide a part of the type named initially, in which a material-sparing and a secure joining of the components as well as a material-sparing final processing of the joined part are assured.

These objects are accomplished by a method according to the features of claim 1 as well as a part according to the features of claim 14.

Advantageous embodiments of the invention are described in the respective subclaims.

DESCRIPTION OF THE INVENTION

A method according to the invention for producing and repairing a part comprising at least two metal components joined together, in particular, components of a gas turbine, comprises the joining and connection of corresponding joining surfaces of the components by means of a pressure welding process. In the joining process, a machining allowance is upset in the region of a joining zone of the two joining surfaces. In another method step, after joining the two components, the machining allowance is processed by means of a precise electrochemical machining (PECM) until a pre-defined final contour of the part is obtained. By combining a pressure welding method with an electrochemical machining method, namely precise electrochemical machining, on the one hand, a secure and material-sparing joining of the components to be joined, and, on the other hand, a material-sparing final processing of the joined part are assured. This particularly concerns slender parts having three-dimensional geometries, such as, for example, thin-walled blades of gas turbines. The corresponding final contour can be introduced without the danger of a bending of the geometry, particularly the blade geometry. By employing the pressure welding method, different metal material combinations can also be used for the individual metal components that are to be joined. Thus, for example, the blades and the rotor disk of a so-called Blisk of a gas turbine may have different material compositions. In addition, the method according to the invention is suitable for repairing parts. Thus, the machining allowance region produced by the pressure welding method brings about an equalizing of the outer contour also in the case of repair, wherein the upset machining allowance region is subsequently brought to a pre-defined final contour of the repaired part by precise electrochemical machining.

In an advantageous embodiment of the method according to the invention, the pressure welding method is an inductive low-frequency or high-frequency pressure welding method, wherein the frequencies used are selected from a range between 0.05-2.5 MHz.

In other advantageous embodiments of the method according to the invention, the precise electrochemical machining is conducted by means of a synchronous machining sink-down process simultaneously on all sides of the part. In this case, the machining can be conducted by means of a hollow electrode. It is also possible, however, that machining is conducted by means of at least one electrode guided on each opposite-lying side of the part. By the synchronous sink-down process, any possible damaging, particularly a possible bending of the regions of the part to be machined is reliably prevented.

In another advantageous embodiment of the method according to the invention, in the case of precise electrochemical machining, a targeted guiding of electrolyte along the part is produced in such a way that excavated material does not enter into regions of the part that are to be machined. Therefore, electrically non-conducting guide elements can be disposed on the electrodes and/or the part for conducting the electrolyte. These may also have elastic properties as required. Advantageously, due to the targeted conducting of electrolyte, no unacceptable etching attack occurs on regions of the part to be processed that already have a final contour.

In another advantageous embodiment of the method according to the invention, a passivation of the regions of the part that are not to be machined is carried out for precise electrochemical machining. This can be carried out, for example, by adjusting a suitable electrochemical potential difference between part and electrode. However, it is also possible that the passivation is produced by introducing electrically insulating materials on the surface of the part. Also, by passivating the regions of the part that are not to be processed, in particular, the regions of the part already having the final contour, the latter are protected against an undesired etching attack. In this way, the passivation of the regions of the part already having the final contour, can be combined with the targeted conducting of electrolyte, as is described in the preceding.

In another advantageous embodiment of the method according to the invention, the contour of each electrode is adapted to the final contour of the part. In this way it is possible to very rapidly and precisely conduct the processing step of simultaneous sink-down on both sides.

In another advantageous embodiment of the method according to the invention, the electrodes conduct oscillating movements during the sink-down. Very high surface qualities can be achieved in combination with the pulsed PECM method, since flushing can be conducted completely with fresh, unused electrolyte in the electrode gap between the pulse pauses. Possible gas bubbles and electrode waste are reliably discharged from the electrode gap. In the case of oscillating electrodes, a current pulse is emitted only in the region of the minimum distance between the electrode and the part to be processed. However, the electrolyte rinsing is produced in the region of the maximum distance between electrode and workpiece to be processed.

In another advantageous embodiment of the method according to the invention, the first component is a blade or a part of a blade of a rotor in a gas turbine and the second component is a ring or a disk of the rotor or a blade footing disposed on the periphery of the ring or the disk. This embodiment particularly relates to rotor blades (BLISK or BLING) produced integrally with a rotor disk or a bearing ring. It is also possible, however, that the components are parts of a blade of a rotor in a gas turbine.

The method according to the invention makes possible a material-saving production and repair of Blisks and Blings, in particular with medium-size and small blades. Advantageously, material combinations, i.e., the use of different metal materials, are possible for blade and disk or for blade and ring. A machining allowance region, which leads to an equalizing of the outer contour also in the case of repairing the corresponding part, is produced by the joining process. These regions are also protected from an unacceptable removal of material or etching attack by means of a targeted conducting of electrolyte and/or passivation of the final contour regions of the Blisk or Bling. Finally, large, unilateral bending forces are prevented from operating on the blade, since, for example, a synchronous, low-force machining on both sides is produced via the precise electrochemical machining process. In this way, the final contour can also be obtained in the case of small and/or different machining allowances in a high quality region.

A part of a gas turbine according to the invention comprises at least one first part and one second part and is produced by a method according to the invention, which has been described in the preceding. In this case, the first component can be a blade or a part of a blade of a rotor in a gas turbine and the second component can be a ring or a disk of the rotor or a blade footing disposed on the periphery of the ring or the disk.

This particularly relates to rotor blades (BLISK or BLING) produced integrally with a rotor disk or a bearing ring. It is also possible, however, that the components are parts of a blade of a rotor in a gas turbine.

The invention claimed is:

1. A method for producing and repairing a part comprising at least two metal components joined together, the components being components of a gas turbine, wherein the joining and connection of the corresponding joining surfaces of the components is produced by means of a pressure welding method, and during the joining process, a machining allowance is upset in the region of a joining zone of the two joining surfaces, is hereby characterized in that after joining the two components, the machining allowance is processed by means of a precise electrochemical machining (PECM) until a predefined final contour of the part is obtained, wherein the machining is conducted by means of an electrode;
   the step of performing precise electrochemical machining further comprising a step of disposing an electrically non-conductive guide element on the electrode for guiding an electrolyte;
   whereby the guide element is disposed on the electrode in a way that provides a targeted guiding of the electrolyte along the part so that removed material does not enter into regions of the part that are to be machined;
   wherein, in precise electrochemical machining, the electrode conducts oscillating movements when sunk down, and the step of performing precise electrochemical machining further comprises a step of emitting a current pulse only in a region of minimum distance between the electrode and the part.

2. The method according to claim 1, further characterized in that the pressure welding method is an inductive low-frequency or high-frequency pressure welding method and the frequencies used are selected from a range between 0.05-2.5 MHz.

3. The method according to claim 1, further characterized in that the precise electrochemical machining is conducted by means of a synchronous machining sink-down process simultaneously on all sides of the part.

4. The method according to claim 3, further characterized in that the machining is conducted by means of a hollow electrode.

5. The method according to claim 3, further characterized in that the machining is conducted by means of at least one electrode guided on each opposite-lying side of the part.

6. The method according to claim 1, further characterized in that electrically non-conducting guide elements for conducting the electrolyte are disposed on the electrodes and the part, whereby the guide elements provide the targeted guiding of electrolyte along the part.

7. The method according to claim 6, further characterized in that the guide elements are formed elastically.

8. The method according to claim 1, further characterized in that in precise electrochemical machining, the contour of each electrode is adapted to the final contour of the part.

9. The method according to claim 1,
   wherein the two metal components are a first component and a second component,
   further characterized in that the first component is a blade or a part of a blade of a rotor in a gas turbine and the second component is a ring or a disk of the rotor or a blade footing disposed on the periphery of the ring or the disk.

10. The method according to claim 1, further characterized in that the components are parts of a blade of a rotor in a gas turbine.

11. A part of a gas turbine comprising at least one first component and one second component produced according to a method according to claim 1.

12. The part according to claim 11,
wherein the two metal components are a first component and a second component,
further characterized in that the first component is a blade or a part of a blade of a rotor in a gas turbine and the second component is a ring or a disk of the rotor or a blade footing disposed on the periphery of the ring or the disk.

13. The part according to claim 11, further characterized in that the components are parts of a blade of a rotor in a gas turbine.

14. The method of claim 1, further characterized in that during the step of precise electrochemical machining, regions of the part that match the pre-defined final contour of the part are identified as regions of the part that are not to be machined, and a passivation of the regions of the part that are not to be machined is carried out.

15. The method according to claim 1, wherein
during the step of precise electrochemical machining, regions of the part that match the pre-defined final contour of the part are identified as regions of the part that are not to be machined, and
during the step of precise electrochemical machining, a passivation of the regions of the part that are not to be machined is carried out so that the regions of the part that are not to be machined are not etched;
wherein the passivation of the regions of the part that are not to be machined is carried out by adjusting a suitable electrochemical potential difference between part and electrode.

* * * * *